United States Patent [19]
Ford et al.

[11] Patent Number: 5,150,745
[45] Date of Patent: Sep. 29, 1992

[54] CONTAINER AND METHOD FOR FILLING BATTERIES WITH ELECTROLYTE

[76] Inventors: Dan Ford, Rte. 1, Box 480-A; Benjamin J. Ford, Rte. 1, Box 484, both of Cosby, Tenn. 37722

[21] Appl. No.: 571,496

[22] Filed: Aug. 23, 1990

Related U.S. Application Data

[63] Continuation-in-part of Ser. No. 456,846, Dec. 4, 1989, abandoned.

[51] Int. Cl.$^5$ .................................................. H01M 2/36
[52] U.S. Cl. .................................................. 141/241; 141/236; 141/100; 141/319; 141/325; 141/329; 141/364; 429/72; 429/80
[58] Field of Search ............... 141/100, 234, 236, 237, 141/238, 240, 241, 247, 198, 319, 325–327, 329, 363–366; 429/63, 64, 72, 74, 80

[56] References Cited

U.S. PATENT DOCUMENTS

| | | | |
|---|---|---|---|
| 1,926,343 | 9/1933 | Lucke et al. | 429/74 |
| 1,956,968 | 5/1934 | Altmayer et al. | 141/236 |
| 1,991,604 | 2/1935 | Drabin | 429/64 |
| 2,274,118 | 2/1942 | Altmayer | 141/363 |
| 2,433,989 | 1/1948 | Hansen | 141/363 |
| 2,452,049 | 10/1948 | Hauck | 429/72 X |
| 2,899,481 | 8/1959 | Kardoff | 429/72 X |
| 3,304,965 | 2/1967 | Tate | 141/325 |
| 3,912,541 | 10/1975 | Britz et al. | 429/63 X |
| 4,079,761 | 3/1978 | Herbst, Sr. | 141/198 |
| 4,087,592 | 5/1978 | Okazaki et al. | 429/63 |
| 4,565,750 | 1/1986 | Isoi et al. | 429/72 |
| 4,833,047 | 5/1989 | Isoi et al. | 429/72 |
| 4,980,249 | 12/1990 | Isoi et al. | 141/241 X |
| 5,004,025 | 4/1991 | Robbins | 141/364 |

FOREIGN PATENT DOCUMENTS

| | | | |
|---|---|---|---|
| 0384234 | 10/1923 | Fed. Rep. of Germany | 429/72 |
| 0736431 | 6/1943 | Fed. Rep. of Germany | 429/63 |
| 1044417 | 11/1953 | France | 429/63 |
| 1069529 | 7/1954 | France | 429/63 |
| 5133763 | 10/1980 | Japan | 141/238 |

Primary Examiner—Henry J. Recla
Assistant Examiner—Casey Jacyna
Attorney, Agent, or Firm—William E. Mouzavires

[57] ABSTRACT

A method of charging a battery with electrolyte, utilizing a container having a supply of electrolyte therein and a number of outlet spouts which are simultaneously inserted into the battery cells while the battery is on its side such that when the battery is moved to upright position the electrolyte simultaneously pours into the battery cells from the spouts respectively. The container has a plurality of cells communicating with the spouts respectively and a conduit in the container interconnects all of the cells of the container.

16 Claims, 5 Drawing Sheets

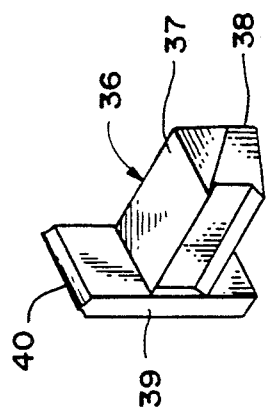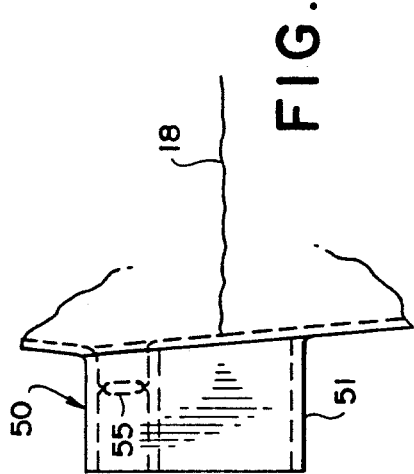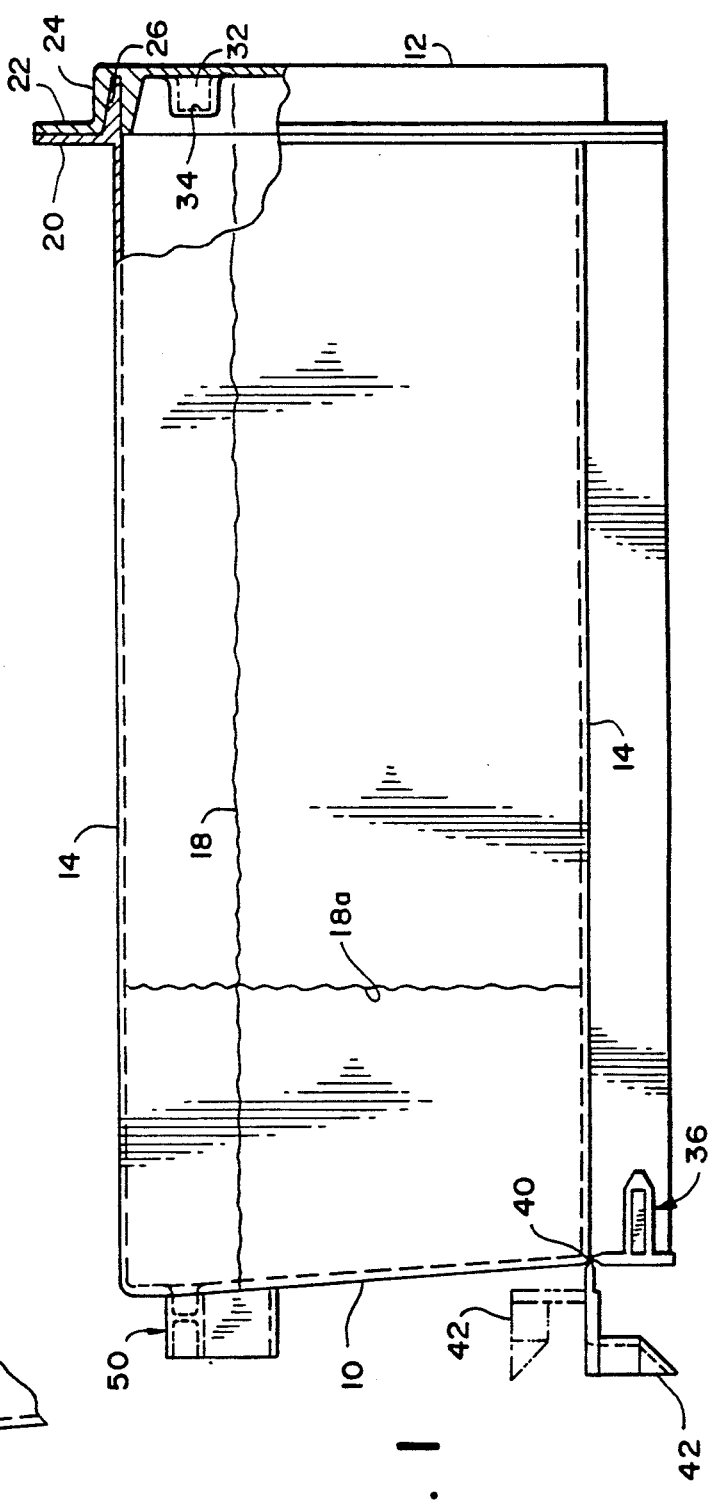

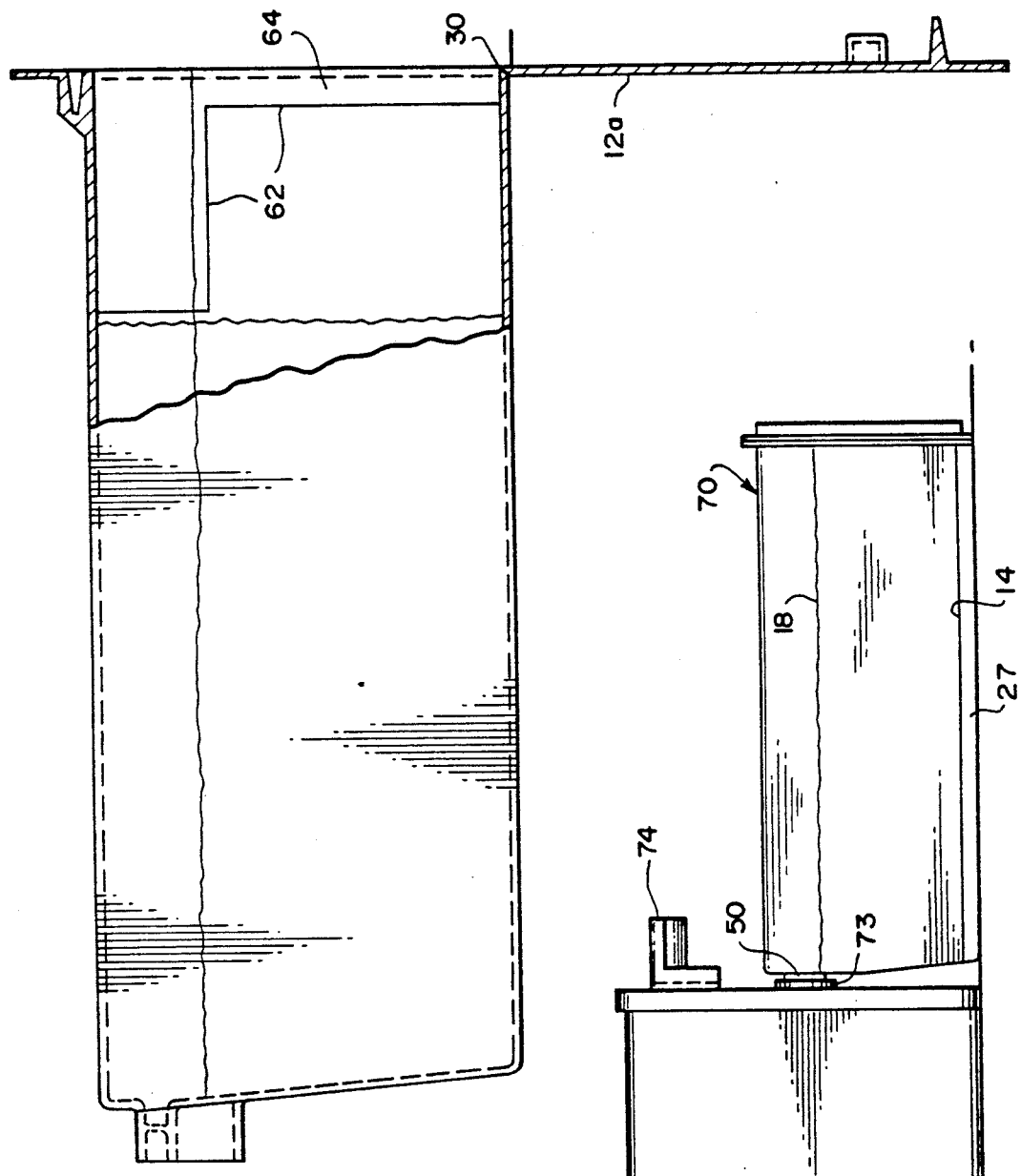

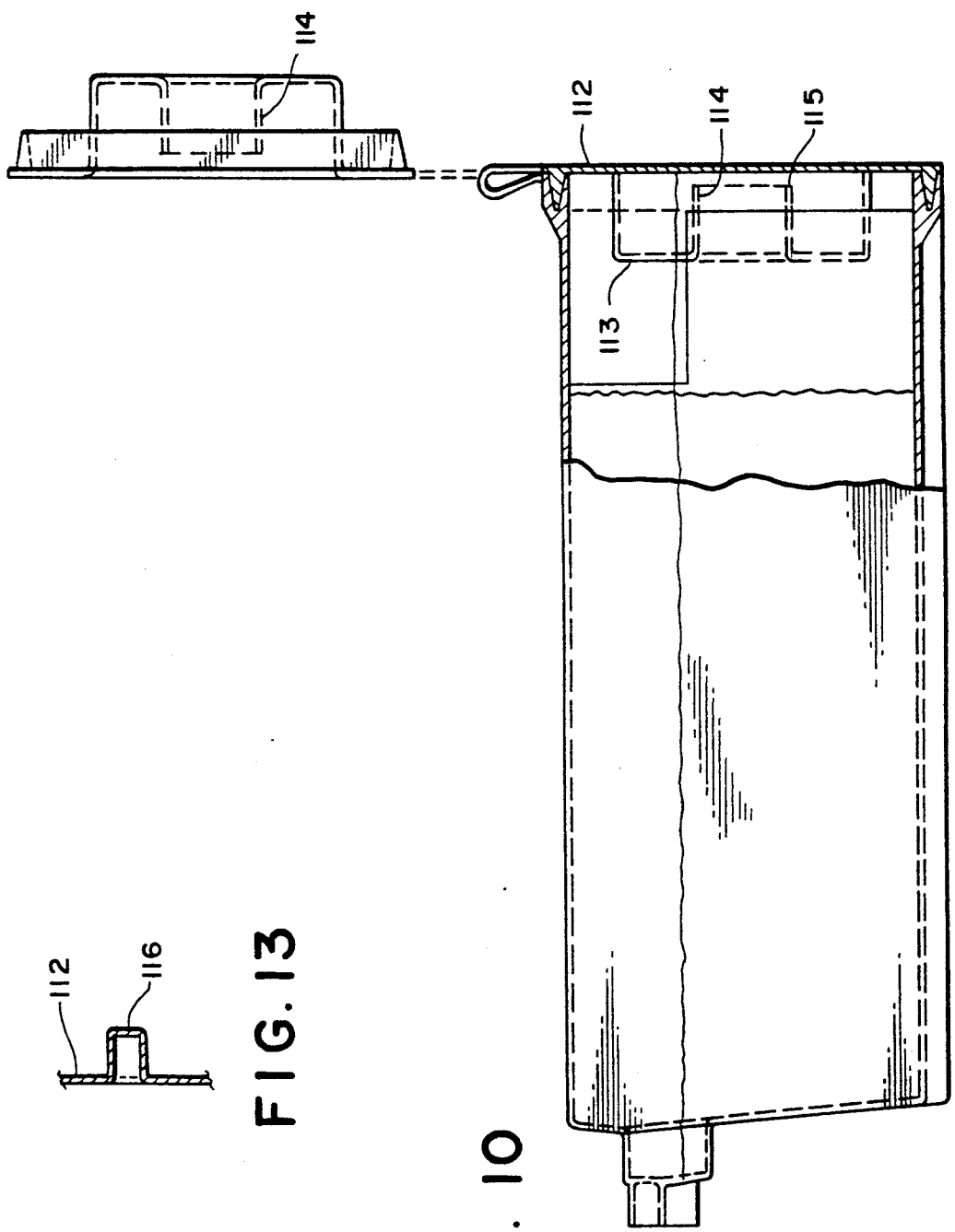
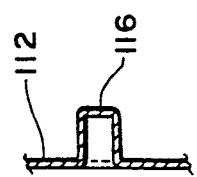

CONTAINER AND METHOD FOR FILLING BATTERIES WITH ELECTROLYTE

RELATED APPLICATION

This application is a continuation in part of our prior copending application, Ser. No. 07/456,846 filed Dec. 4, 1989, now abandoned, and entitled CONTAINER AND METHOD FOR FILLING BATTERIES WITH ELECTROLYTE.

BACKGROUND OF THE INVENTION

The present invention relates to methods and apparatus for filling "bone dry" batteries with electrolyte which includes an acid. The batteries are the type that may be used for example in automobiles, garden tractors or mowers and motorcycles. In one typical situation in industry, a dealer in garden tractors will receive new tractors with the batteries in a "bone dry" state. The dealer must fill the batteries with an acid electrolyte. However, experience has shown that present methods and apparatus for supplying acid electrolyte to the batteries usually results in over-filling at least two or more battery cells. In addition to harmful contact with the user, the spilled acid electrolyte may contact the battery or the floor requiring immediate clean-up of the acid to prevent its corrosive effects. In situations where the spilled acid contacts the brand new lawn mower or tractor, the paint will be removed requiring that the mower or tractor be returned to the manufacturer thereby increasing expense.

After filling the battery with acid, the remaining acid in conventional containers must be disposed of such as by first neutralizing the acid with a base, for example, baking soda and then dumping the neutralized substance in an area approved by pollution standards.

One typical method presently used in industry includes the provision of a squeezeable plastic container including the acid electrolyte and provided with a clear squeezeable plastic tube whose one end is inserted in the container through a cap at the top of the container. The other end of the tube is inserted into a cell of the battery and the container is squeezed with one hand to force the acid through the tube and into the container. The other hand is used to squeeze the tube to stop the flow of acid into the battery cell at the precise moment when the cell is full. The process must be repeated for each of the six cells of a typical battery.

However, experience has shown that it is difficult if not impossible to fill the first two or three battery cells in the above manner without spillage of the acid. For this reason a conventional acid pack for a battery requiring seventy-seven ounces of electrolyte will contain about eighty ounces of electrolyte to compensate for the spilled electrolyte. In many cases, the acid pack will still have some acid remaining after use thus requiring the added precaution of properly disposing of the acid.

Another method of the prior art utilizes a plurality of individual containers blow molded together with each container having a sealed outlet at one end and a sealed vent at the other end. The container outlets are first cut to open them and then the containers are simultaneously inserted into the battery. The vents of each container are then cut to open their interiors to atmosphere whereupon the electrolyte will flow into the battery cells. Such an assemblage of containers is not only expensive to manufacture but it also requires that each container be individually charged with electrolyte during the manufacturing process and further requires that each of the container vents be individually cut or opened to allow dispensing of the electrolyte. Containers of this general type are disclosed in U.S. Pat. Nos. 4,565,750 and 4,833,047 to Isoi et al.

OBJECTS OF THE INVENTION

It is an object of the present invention to provide a novel and improved container and method for filling or supplying batteries with acid electrolyte. Included herein are such a container and method which will fill a battery with acid electrolyte in a highly safe and efficient manner which overcomes the problems or drawbacks attending the conventional method described above.

A further object of the present invention is to provide novel method and apparatus for filling or supplying a battery with acid electrolyte and which will substantially reduce, if not eliminate, spillage of the acid. Included herein are such method and apparatus which will fill a bone dry battery with acid electrolyte without leaving any unused acid to dispose of.

A still further object of the present invention is to provide a novel method and apparatus for simultaneously filling all of the cells of a battery with electrolyte and with little or no spillage of the electrolyte.

SUMMARY OF THE INVENTION

In accordance with a preferred method and apparatus of the present invention, a container is provided with a plurality of aligned pouring spouts at the same predetermined elevation and with a spacing therebetween corresponding to the spacing between the cells of a battery to be filled with electrolyte.

The container is supplied with an amount of acid electrolyte equal to the capacity of the battery to be filled. The level of electrolyte in the container is below the level of the pouring spouts when the container is placed in a certain position with the spouts spaced in a horizontal plane. In this container position, the pouring spouts are opened or unsealed and then the spouts are simultaneously and respectively inserted into the cells of the battery which has been placed on its side in order to accept the container spouts. The mated battery-container assembly is then pivoted as a unit ninety degrees to place the battery in a normal upright position with the inserted container in an inverted pouring position. A vent hole is then established through the container, and the acid then pours by gravity simultaneously into all of the cells of the battery.

In the preferred embodiment, the container is provided with a plurality of compartments or cells corresponding to the number of cells in the battery to be filled. Each compartment communicates with an associated spout, and as the compartments each have the same amount of acid which is also equal to that required by a cell of the battery, all of the cells of the battery will be simultaneously supplied with the required amount of acid when the container is emptied of its contents in the manner described above. A conduit in the container communicates all of the compartments with each other so that the amount of electrolyte in the compartments is equalized. Other features of the invention will be described below:

DRAWINGS

Other objects and advantages of the present invention will become more apparent from the following more detailed description taken in conjunction with the attached drawings wherein:

FIG. 1 is an elevational view of a container embodying the present invention as seen on its side and with portions shown in cross-section;

FIG. 2 is an enlarged view of a spout portion of the container as shown in FIG. 1;

FIG. 5 is a perspective view of a punch used to puncture a hole in the pouring spouts of the container;

FIG. 8 is a view generally similar to FIG. 1 but showing a modification of the bottom end wall of the container as seen in the open position;

FIG. 9 is a view of the container shown inserted into a battery to be filled during the method of the present invention;

FIG. 10 is a side elevational view of a container constituting another embodiment of the invention;

FIG. 13 is a fragmental cross-sectional view of a portion of the container taken generally along lines 13—13 of FIG. 12.

DETAILED DESCRIPTION

Figure 4:
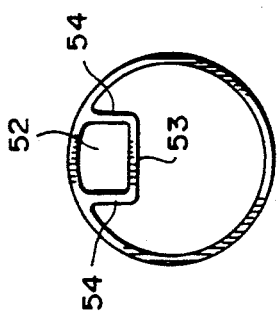
FIG. 4 is an enlarged view of one of the spouts of the container when in the position of FIG. 3.

Referring to the drawings in detail, there is shown in FIG. 1 for illustrative purposes only, a container representing a preferred embodiment of the present invention and which is preferably used in accordance with the method of the present invention to fill or supply with acid electrolyte batteries such as bone-dry, U-1 or motorcycle batteries that are typically rated at 12 volts and require either 77, 64 or 32 ounces of electrolyte. As will be seen, the invention may be applied to other types and sizes of bone-dry or wet batteries.

Figure 3:
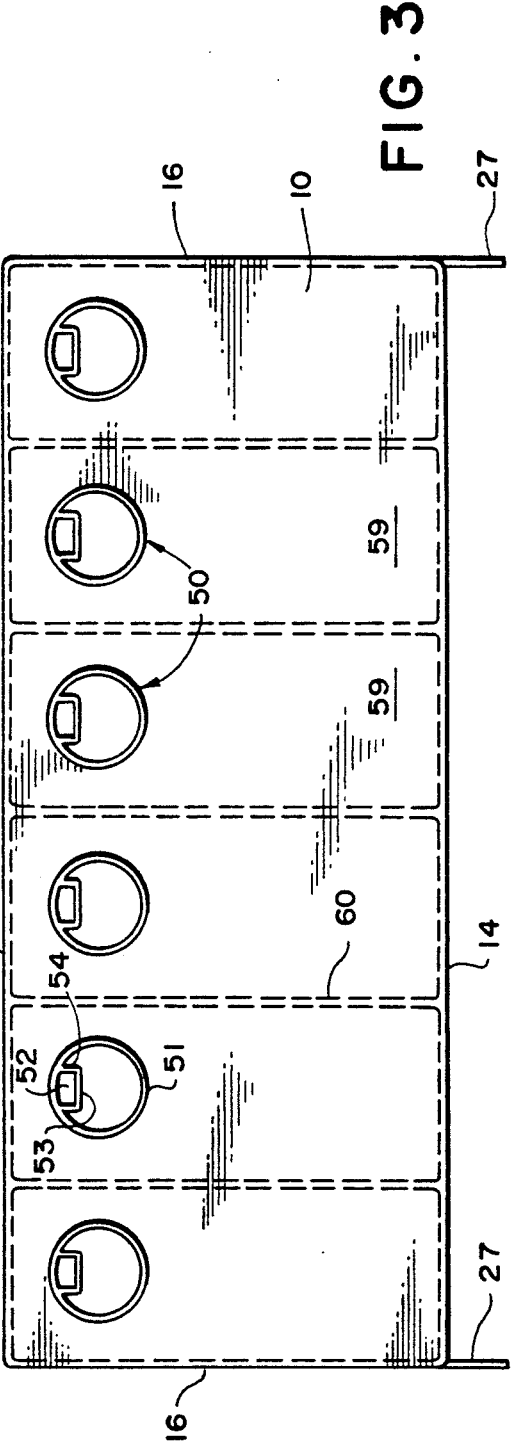
FIG. 3 is a top view of the container when in the upright position.

Referring to FIGS. 1 and 3, the container includes a top wall 10, a bottom 12 and opposite pairs of side walls 14 and 16 defining a chamber for receiving acid electrolyte whose level is shown at 18 when the container is positioned on its side as shown in FIG. 1 and at 18a when the container is in the upright position. The container is preferably molded from polyethelene or polypropelene and although shown as having a generally rectangular shape, other shapes may be employed. The top wall 10 in the preferred embodiment is injection molded integral with the side walls 14 and 16 while the bottom wall 12 is formed separately and heat sealed at its perimeter to the container side walls.

In the specific embodiment shown the side walls 14, 16 are provided with a flange 20 about their lower end for receiving a flange 22 of the bottom wall 12 which is formed with a side wall portion 24. The latter has a groove 26 receiving the lower end of container side walls 14, 16 as shown in FIG. 1. The flanges 20, 22 are heat sealed together after electrolyte has been supplied in the container through the lower end thereof. One of the side walls 14 has a pair of depending flanges or runners 27 so that the container may be placed on that side in a generally horizontal position as shown in FIGS. 1 and 9 for filling a battery as will be described below.

In another embodiment shown in FIG. 8, the end wall 12a is formed integral with the container along a hinge line 30 so that the end wall 12a may be easily folded into position closing the container after being charged with electrolyte.

In order to facilitate the establishment of a vent in the container as will be described below, the bottom wall 12 is preferably provided with a recess 32 shown in FIG. 1. The bottom wall 34 of the recess 32 is dimensioned to be punctured by any suitable implement such as punch 36 shown in FIG. 5. Punch 36 has a shank portion 37 projecting from a flange 39 and terminating in a beveled face forming a cutting edge 38 receivable in the recess 32 for piercing recess wall 34 to form a vent as will be described further. Preferably the punch 36 is molded with the container to be severed therefrom along a line 40 at the top of the flange 39 as shown in FIGS. 1 and 5. Moreover the bottom of punch 36 in the area generally designated 42 in FIG. 1 is formed hollow in order to vent the interior of the container to atmosphere after the recess wall 34 is punctured while the punch remains in the recess 32. It will be understood that any other suitable means may be employed to vent the container to atmosphere just prior to pouring of the acid into the battery in accordance with the method to be described below.

Figure 6:
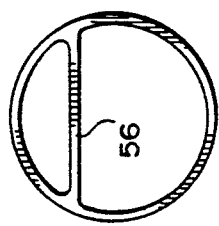
FIG. 6 is a top view of a modified pouring spout that may be employed in lieu of that of FIG. 4.

Referring to FIGS. 1, 2 and 3 the front wall 10 of the container is provided with a plurality of spouts generally designated 50 for pouring electrolyte from the container and into the battery cells. In the preferred embodiment, the spouts 50 include a cylindrical wall 51 projecting upwardly from the top container wall 10 and surrounding a pouring passage 52 defined by internal portions 53 and 54 of the spout as shown in FIGS. 3 and 4. Pouring passage 52 is manufactured closed by a seal or closure 55 shown in FIG. 2 which must be removed or punctured just prior to pouring electrolyte into the battery as will be described. In the embodiment of FIGS. 1, 3 and 4 the pouring passage 52 has a generally rectangular cross-section formed by opposite parallel walls 54 joined on one side by an internal wall 53 and on the other by an accurate portion of the spout wall 51 as shown in FIG. 4. Other shapes may also be employed as illustrated in FIG. 6 where an internal chordal wall 56 interconnects opposite portions of the external spout wall to define a pouring passage on one side of the internal wall 56.

Figure 7:
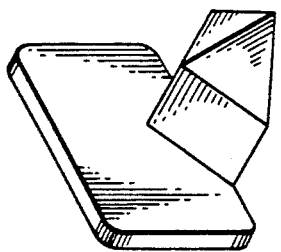
FIG. 7 is a perspective view of punch that may be used with the spout of FIG. 6.

Returning now to the spout of FIG. 4, the seal or closure 55 may be removed or punctured in any suitable manner such as by the punch 36 shown in FIG. 5 and described above. The shank 37 of the punch is dimensioned to slide in the pouring passage 52 so that the cutting edge 38 of the punch may be used to break the seal 55 of the pouring passage. FIG. 7 shows a punch shaped to be used with the pouring passage of FIG. 6

As shown in FIG. 3 there are six pouring spouts 50 in the preferred embodiment corresponding to the six cells in a typical twelve volt battery. Spouts 50 are dimensioned to be insertable within the mouth or inlets of the battery cells and furthermore the spacing between spouts 50 is made so that all six spouts 50 may be simultaneously inserted into the six cells of the battery as will be described further. In addition the spouts 50 are specifically positioned so that when the container is placed on its side as shown in FIG. 1, the level 18 of the electrolyte will be below the level of the pouring passages 50 as shown in FIGS. 1 and 2. In the specific embodiment shown where side walls 14 are parallel to each other, the spouts 50 are centered on a line parallel and adjacent to one of the sides 14 of the container as shown in FIG. 3.

In the preferred embodiment shown, the interior of the container is divided into six cells or compartments 59 by a plurality of parallel partitions 60 having a generally rectangular shape and fixed to and extending between the opposite side walls 14 of the container as shown in FIG. 3. As shown in FIG. 3 the spouts 50 respectively communicate with the compartments 59, there being of course one spout 50 per compartment 59. The top ends of the partitions are fixed to the top wall 10 of the container while their lower ends terminate short of the bottom wall 12 of the container so as to provide a space across the bottom of the container communicating the compartments 59 with each other. In this manner the amount of electrolyte supplied to the container will be equally divided among the compartments 59 so that each cell of the battery to be filled with acid will receive the same amount of electrolyte and the total electrolyte received in the compartments will equal the total amount of electrolyte required in the battery to be filled. The embodiment of FIG. 8 shows one of the partitions 62 that may be employed and the space 64 at the bottom of the container which communicates with all of the compartments in the container.

In one preferred embodiment shown in FIGS. 1 through 4 the spouts 50 have a diameter of about 0.750 inches and they project from the top wall a distance of about 0.375 inches. The container has a height of about 8.06 inches, a dimension of about 7.54 inches between side walls 16 and a dimension of about 3.00 inches between side walls 14.

In accordance with the method of the present invention, the container of the invention being sealed and supplied with the requisite amount of electrolyte, is placed on its side 14 as shown in FIG. 9 where 70 denotes the container and 72 a bone-dry battery to be filled with electrolyte; one terminal 74 of the battery also being shown. Battery 72 is also placed on its side so that the mouths or inlets 73 of the battery cells face horizontally towards the pouring spouts 50 of the container 70. The seals 55 in the pouring spouts 50 are each broken and then the pouring spouts are simultaneously inserted into the cell mouths 73 of the battery as illustrated in FIG. 9. The mated battery and container assembly is then rotated or pivoted as a unit ninety degrees (90) in the counterclockwise direction (as viewed in FIG. 9) to place the battery in normal upright position with the container 70 inverted and with its pouring spouts still inserted in the cell mouths 73. A vent is then established through the container wall 12 at location 34 as described above. Once the vent is established the electrolyte will flow freely from the container compartments 59 and into the battery cells respectively. The entire amount of electrolyte is emptied into the container which may then be disposed of without any need to first dispose of residue electrolyte in the container. The filled battery is then supplied with caps over the mouths 73 of the cells. It should also be noted that during manipulation of the container and battery and the pouring of electrolyte the cylindrical spout walls 51 will block and prevent any electrolyte from escaping from the battery.

Figure 12:
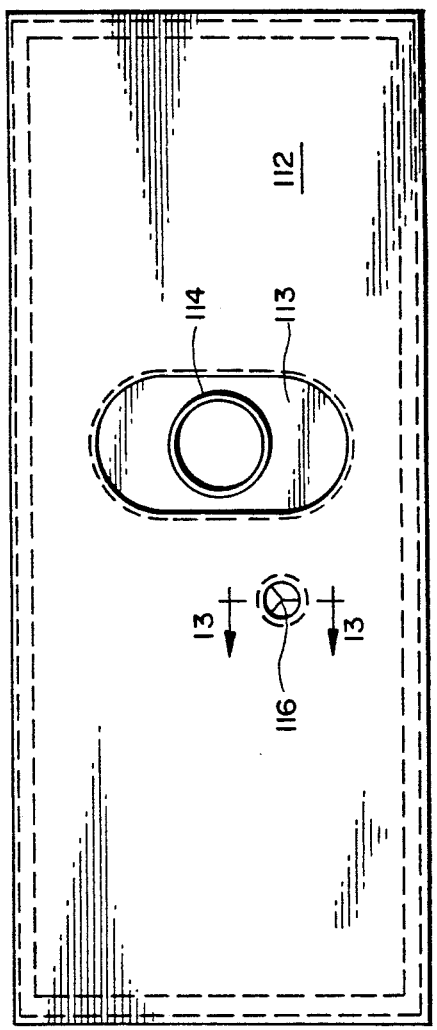
FIG. 12 is a bottom elevational view of the container of FIG. 10.
Figure 11:
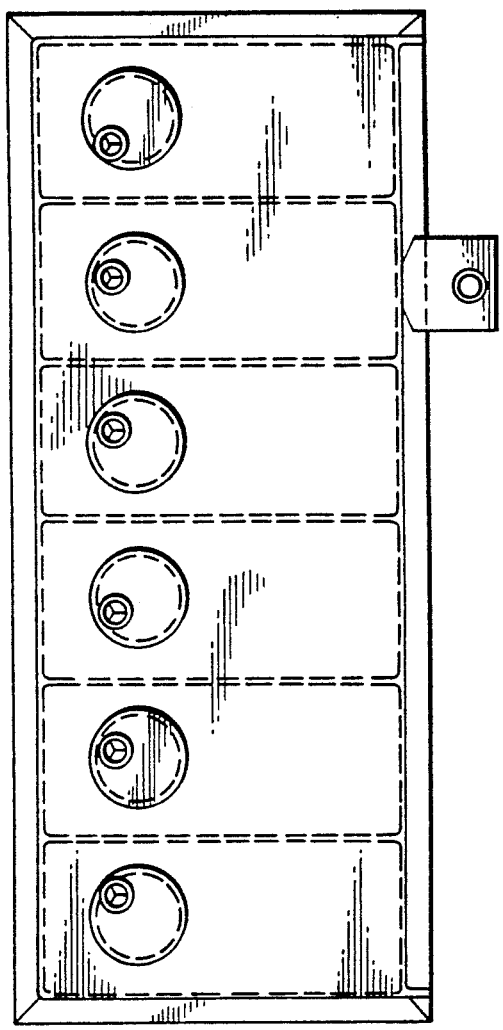
FIG. 11 is a top elevational view of the container of FIG. 10.

FIGS. 10 through 13 disclose another embodiment of the container of the present invention wherein the bottom wall 112 is provided with a recessed portion 113 having a filler tube 114 projecting rearwardly for introducing electrolyte into the container. After the container is charged with electrolyte, a seal plug (not shown) is inserted in tube 114 and friction welded or otherwise sealed in the tube 114 to seal the electrolyte in the container. The end 115 of tube 114 is spaced from the plane of bottom wall 112 as shown in FIG. 10 to allow the container to be placed upright on its bottom wall 112. FIG. 10 also shows the bottom wall 112 in a position prior to being sealed into the bottom of the container. A flexible hinge 117 interconnects the bottom wall 112 to the container to facilitate handling. FIG. 12 shows a plan view of the bottom wall 112 including the recessed portion 113, filler tube 114. A vent area 116 is also disclosed in FIG. 12 as well as FIG. 13.

Although a specific container shape and size including a specific number of pouring spouts has been shown and described, other types of containers may also be employed within the spirit and scope of the present invention. Indeed the method and container of the present invention may be used in handling other dangerous or harmful substances in addition to acids.

We claim:

1. For use with an acid cell battery having a plurality of cells to be charged with acid and inlets communicating with the cells respectively; a portable container having wall portion defining a chamber and acid in the chamber, one of said wall portions having a plurality of pouring spouts communicating with said chamber and alignable with the inlets of an associated battery such that said spouts may be simultaneously aligned with said inlets respectively to simultaneously pour acid from the chamber into the batter cells through the inlets when the container is placed into a pouring position relative to the battery, partition means in said chamber defining a plurality of cells, said spouts being in communication with said container cells respectively, and wherein said cells in the container are in communication with each other, and said wall portions include upper and lower opposite wall portions and opposite side wall portions, said partition means extend to and between said opposite side wall portions and from said upper wall portion towards said lower wall portion, and wherein said spouts are located in said upper wall portion and each spout includes a pouring passage, said container being charged with electrolyte at a level which is below all of the pouring passages when the container is positioned on a particular one of said side wall portions thereof.

2. The container defined in claim 1 wherein said lower wall portion has a means for establishing a vent into the container.

3. The container defined in claim 2 wherein said spouts are dimensioned to be inserted within the inlets of an associated battery.

4. The container defined in claim 3 wherein said spouts each have removable seal means formed integral therewith for sealing the spouts prior to use.

5. The container defined in claim 2 wherein said lower wall portion includes a closure for closing the container after it has been supplied with acid.

6. The container defined in claim 1 wherein said lower wall portion includes a recess chamber having a filling aperture therein.

7. The container defined in claim 1 wherein said partitions are spaced from the lower wall portion to define a passage communicating all of the cells with each other.

8. The container defined in claim 7 wherein said lower wall portion is a closure for closing the container after being supplied with acid.

9. The container defined in claim 8 wherein said closure is hinged to the container.

10. The container defined in claim 8 wherein said closure has means for establishing a vent in communication with said chamber and cells.

11. The container defined in claim 1 wherein said spouts are at the same level and spaced rom each other corresponding to the spacing of the battery inlets.

12. The container defined in claim 1 wherein each pouring passage is surrounded by and spaced from the spout.

13. A portable container for supplying a battery cell with electrolyte, the container comprising a body defining a chamber divided into a number of cells, a predetermined amount of electrolyte in the chamber, said body having pouring spouts respectively communicating with the cells and dimensioned to be inserted in cells of a battery to pour the electrolyte of the container therein, rupturable seals in the pouring spouts and adapted to be ruptured to enable pouring of the electrolyte through the spouts, vent means on the container for venting the chamber including the cells thereof to permit pouring of electrolyte therefrom, means for supplying electrolyte into the chamber of the container and for closing the chamber after electrolyte is supplied therein, and conduit means communicating cells of the container with each other and wherein said conduit means is located such that when the container is placed in a predetermined position the electrolyte will be equalized among the cells of the container and said body includes wall portions including upper and lower opposite wall portions and opposite side wall portions, said body further including partitions extending between said opposite side wall portions and from said upper wall portion towards said lower wall portion, and wherein said spouts are located in said upper wall portion and each spout includes a pouring passage, said container being charged with electrolyte at a level which is below all of the pouring passages when the container is positioned on a particular one of said side wall portions thereof.

14. The container defined in claim 13 wherein said partitions define said cells and said conduit means extends transversely of said partitions adjacent said lower wall portion.

15. The container defined in claim 13 wherein said lower wall portion is made separately from other walls of the containers but sealed thereto.

16. The container defined in claim 15 wherein said means for supplying electrolyte includes a recess in said lower wall portion and a filling aperture in the recess for filling the container with electrolyte.

* * * * *